US011922531B2

(12) United States Patent
Aich

(10) Patent No.: US 11,922,531 B2
(45) Date of Patent: Mar. 5, 2024

(54) RIDE REQUEST INTERACTIONS

(71) Applicant: Ford Global Technologies, LLC, Dearborn, MI (US)

(72) Inventor: Sudipto Aich, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 17/500,364

(22) Filed: Oct. 13, 2021

(65) Prior Publication Data

US 2022/0036494 A1 Feb. 3, 2022

Related U.S. Application Data

(62) Division of application No. 16/585,234, filed on Sep. 27, 2019, now Pat. No. 11,210,756.

(60) Provisional application No. 62/738,289, filed on Sep. 28, 2018.

(51) Int. Cl.
| | |
|---|---|
| *G06F 15/16* | (2006.01) |
| *G01C 21/34* | (2006.01) |
| *G06Q 10/02* | (2012.01) |
| *G06Q 10/047* | (2023.01) |
| *G06Q 50/30* | (2012.01) |
| *G10L 15/18* | (2013.01) |
| *H04W 4/14* | (2009.01) |

(52) U.S. Cl.
CPC .......... *G06Q 50/30* (2013.01); *G01C 21/343* (2013.01); *G01C 21/3438* (2013.01); *G06Q 10/02* (2013.01); *G06Q 10/047* (2013.01); *G10L 15/18* (2013.01); *H04W 4/14* (2013.01)

(58) Field of Classification Search
CPC ...... G06Q 50/30; G06Q 10/02; G06Q 10/047; G01C 21/343; G01C 21/3438; G10L 15/18; H04W 4/14
USPC ......................................................... 709/206
See application file for complete search history.

(56) References Cited

U.S. PATENT DOCUMENTS

| | | | |
|---|---|---|---|
| 2009/0119001 A1 | 5/2009 | Moussaeiff et al. | |
| 2009/0156241 A1 | 6/2009 | Staffaroni et al. | |
| 2010/0094529 A1* | 4/2010 | Gupta .................... | G06F 16/40 |
| | | | 705/5 |
| 2010/0153279 A1 | 6/2010 | Zahn | |
| 2013/0024249 A1 | 1/2013 | Zohar et al. | |
| 2013/0029701 A1* | 1/2013 | Cabos ................... | H04L 51/066 |
| | | | 455/466 |
| 2015/0242936 A1* | 8/2015 | Komenda .......... | G06Q 30/0635 |
| | | | 705/26.81 |
| 2017/0192827 A1* | 7/2017 | Ghafourifar ......... | G06F 9/5027 |
| 2018/0040081 A1* | 2/2018 | Bhuiya ............. | G06Q 10/1095 |
| 2018/0113857 A1 | 4/2018 | Lopez et al. | |

(Continued)

*Primary Examiner* — Imad Hussain
(74) *Attorney, Agent, or Firm* — Brandon Hicks; Eversheds Sutherland (US) LLP

(57) ABSTRACT

A provider, such as a transportation management service, can manage transport for a number of riders between various locations. A customer can request transport between different locations. The provider may analyze the request for salient information, such as information corresponding to a start and end location, and determine whether there are errors in the salient information that would prevent the provider from providing the requested service. When the provider detects errors, the provider may request additional information from the customer in order to correct the errors.

8 Claims, 10 Drawing Sheets

(56) References Cited

U.S. PATENT DOCUMENTS

2018/0233141 A1* 8/2018 Solomon .................. G06N 5/025
2020/0027039 A1* 1/2020 Miller .................. G06Q 10/025

* cited by examiner

RIDE REQUEST INTERACTIONS

CROSS REFERENCE TO RELATED APPLICATION(S)

This application claims the benefit of, priority to, and is a divisional application of U.S. patent application Ser. No. 16/585,234, filed Sep. 27, 2019, which claims the benefit of and priority to U.S. Provisional Application Ser. No. 62/738,289, filed Sep. 28, 2018, which are both hereby incorporated by reference herein in their entireties.

FIELD OF INVENTION

The present disclosure is generally directed to systems and methods that allow for ride request interaction in order to fulfill requests, as well as error correction process for ride requests and ride request modification.

BACKGROUND

People are increasingly turning to a variety of different transportation and mobility offerings, including ridesharing and e-biking in addition to conventional public transit offerings such as trains and public buses. Ridesharing can involve riders being allocated vehicles that are dedicated to those riders for a period of time, or being allocated seats on vehicles that may have other passengers riding at the same time. While individually allocated cars can have some benefits, sharing vehicles can reduce costs and provide some certainty as to scheduling. The sharing of vehicles among multiple concurrent riders can have various constraints, however, as riders may want some certainty as to the time of the ride and arrival at the destination, such that flexibility of the routes may be limited.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
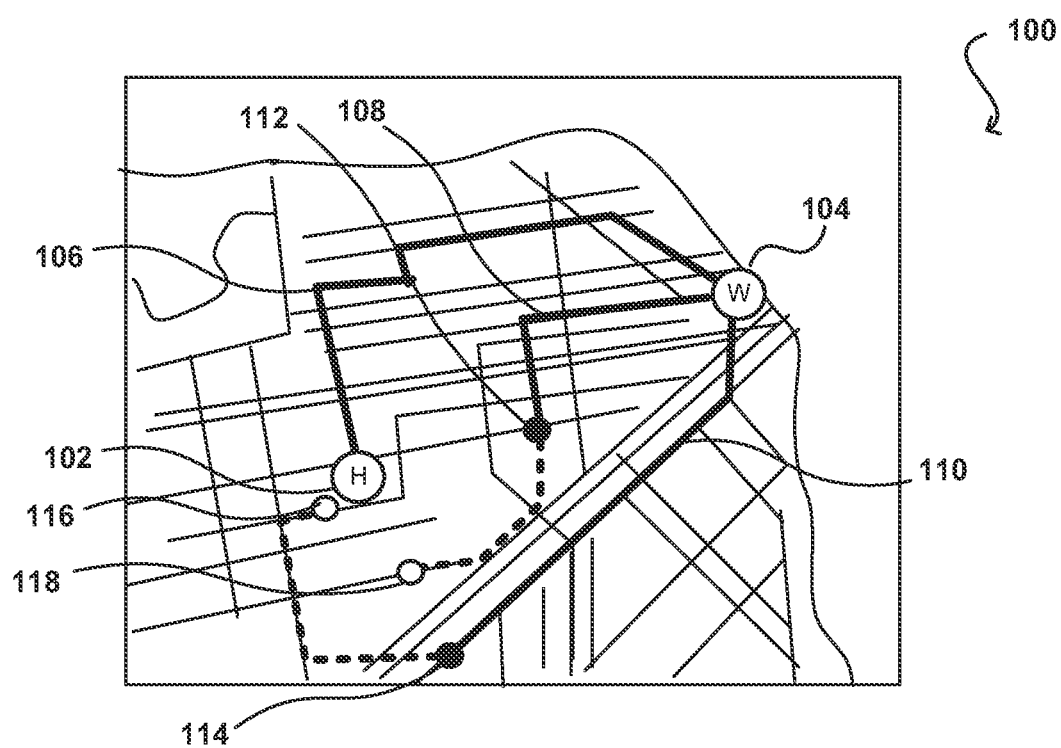
FIG. 1 illustrates an example ride request environment in which aspects of various embodiments can be implemented.

Approaches described and suggested herein relate to the providing of transportation between specified locations. Disclosure is provided herein related to approaches for requesting, modifying, and confirming transportation arrangements between specified locations using text or voice requests with limited data transmission. The requests can relate to the transportation of people, animals, packages, or other objects or passengers, from an origination location to a destination location. The request may also include a time component, such as a requested time of departure or arrival. A provider, such as a transportation service, can utilize a request verification process to evaluate the textual or voice requests to determine whether additional information would clarify or otherwise enable the request to be confirmed by the provider. One or more text or voice extraction processes can be applied to identify salient information from the requests. Upon verification of the salient information, a confirmation may be provided to the user. Different communications between the user and the provider may be exchanged to provide additional information.

The user may request transportation via a user device that has limited mobile data capabilities. For example, the user device may not be a "smartphone" but may still be capable of connecting to cellular network for voice and short message service (SMS) communication, just not be configured for Internet data communication. The user device may lack the capability to download and install mobile applications for execution on the user device. The user device may be capable of data communication, but such communication may be turned off, such as when the user is traveling to a foreign country or when the user has exceeded an allotted quantity of data communication. Accordingly, approaches described and suggested herein may relate to transportation requests with a reduced or limited data load on the user device, for example by communication via the cellular voice network and/or SMS communication. As will be described herein, voice network communication and/or SMS communication may lack certain characteristics related to requests made over data networks, such as GPS location services and chat functionality with the provider. Accordingly, requests, clarifications, and confirmations may be simplified to both reduce data transmission and also reduce the likelihood of confusion or miscommunication when requesting the transportation services.

The provider may establish a call center to receive requests from users via voice communications. The call center may be automated or substantially automated to receive voice commands from the user, which are analyzed for salient information, such as a pick up location, number of riders, date, time, destination location, a time component, and so forth. The call center may provide a prompt to the user, such as "Please provide pick up location." or "What time would you like to arrive at your destination?" As a result, in various embodiments, users may schedule rides utilizing traditional phone services without utilizing a mobile user device, such as a cellular phone. This may be advantageous to older or less affluent users that do not have cellular phones.

The provider may establish pre-determined drop off and pick up locations, for example based upon demographic information, previous requests, or the like. For example, a predetermined drop off location may correspond to a "Park and Ride" location where a bus service may take users into a city center to a second pre-determined drop off location. The pre-determined drop off may have a code or tag that may be associated with requests from the user. For example, the user may request a drop off at "Park and Ride 2" rather than providing a street address and/or intersection. This may simplify the text evaluation and verification process for the provider. Similarly, the provider may establish pre-determined pick up locations within population centers. These pick up locations may be particularly selected to minimize walking distances for users, for example within a set number of blocks or miles. Furthermore, in various embodiments, the pickup locations may also have codes or tags. Accordingly, rather than requesting "A ride to the intersection of Smith and Main from the intersection of Elm and Spruce" the user may request "A ride to Park and Ride 2 from Neighborhood B." The codes and/or tags may simplify the verification process and also simplify the requesting process for the user, which may improve the user experience and incentivize the user to continue with the service.

Illustrative Embodiments

FIG. 1 illustrates an example location 100 in which aspects of the various embodiments can be implemented. In this example, a user can request transportation from an origin 102 to a destination location 104 using, for example, an application executing on a client computing device, a voice service, such as over a cellular network, or a text message service, such as SMS. Various other approaches for submitting requests, such as by alternative messaging or telephonic mechanisms, can be used as well within the scope of the various embodiments. Further, at least some of the requests can be received from, or on behalf of, an object being transported or scheduled to be transported. For example, a client device might be used to submit an initial request for an object, package, or other deliverable, and then subsequent requests might be received from the object, for example, or a device or mechanism associated with the device. Other communications can be used in place of requests, as may relate to instructions, calls, commands, and other data transmissions. For various embodiments discussed herein a "client device" should not narrowly be construed as a conventional computing device unless otherwise stated, and any device or component capable of receiving, transmitting, or processing data and communications can function as a client device in accordance with various embodiments.

Some communications can include transmission of messages using separate cellular networks. For example, one message such as a request can be transmitted using a first cellular network, whereas a second message, such as a confirmation, can be transmitted using a second cellular network. In some instances, the first and second cellular networks can be the same network or can be separate networks.

The transportation can be provided using one or more vehicles (or other modes of transportation) capable of concurrently transporting one or more riders. While riders as used herein may often refer to human passengers, it should be understood that a "rider" in various embodiments can also refer to a non-human rider or passenger, as may include an animal or an inanimate object, such as a package for delivery. The rides provided to an individual rider from the point of departure to the point of arrival may also involve one or more vehicles, which may be of the same or different types, for the same or different modes of transportation. For example, in FIG. 1 a customer of a transportation service might want to use the service to obtain transport from a specified origin 102 or point of departure, such as the user's home, to a specified destination 104 or point of arrival, such as the user's place of employment. There may exist a variety of different routes 106, 108, 110 that the user may take in order to reach the destination 104. For example, the route 106 may include a transportation service that takes the user from the origin 102 directly to the destination 104. However, route 108 and route 110 may include intermediate stops 112, 114, such as a bus stop (which may be referred to as a Park and Ride) that positions the user to take a second transportation service to reach the destination 104. Accordingly, while the routes 108, 110 may indicate the final destination 104 to the user, the transportation service may only provide transportation to the intermediate stops 112, 114 and enable the user to choose a different mode of transportation and/or provider for the remainder of the trip.

Various other types of locations or ways of specifying locations can be used as well within the scope of the various embodiments. There may be modes of transportation offered that use fixed routes (such as trains or public buses), semi-fixed routes (such as shuttle buses), flexible routes (such as rideshares in passenger vehicles), or complete flexibility (such as e-bikes or scooters), among other such options. While more flexible options, such as ride shares, may provide for the shortest travel times in some situations, they may also come at a higher cost than fixed route options, such as subways or public buses. Further, flexible route options such as rideshares may be subject to traffic congestion or other issues that may introduce additional uncertainty into arrival times, and so forth.

Customers or riders may choose to take fixed route transportation for at least some of their journey. For example, a user might take a public bus out of downtown due to the relatively low cost and frequent availability of the buses. These buses can go to one or more stops from which the user can obtain a connecting transport if needed, or desired, to complete a remainder of the journey. A user might want flexibility in the timing of the bus or initial mode of transport, such as to be able to catch the next available bus along a given route. The user might also want to be able to select from multiple available routes to obtain additional options. As illustrated in FIG. 1, there may be a number of bus routes that go from a destination, such as a bus stop near the user's home, to one or more destinations along substantially fixed routes. The user may be willing to take any of these routes from the point of origin 102, particularly at rush hour or in inclement weather.

The origin 102 may be provided directly to the transportation service as the location where to start services. For example, the user may provide an address or an intersection that corresponds to the origin 102. Furthermore, as illustrated in FIG. 1, pre-determined pick up locations 116, 118 may be arranged throughout the location 100. For example, the pickup locations 116, 118 may be particularly arranged based on population centers, anticipated foot traffic, past pick up history, or the like. Accordingly, the user may specify the origin 104 as one of the pickup locations 116, 118. The pickup locations 116, 118 may correspond to or be associated with a code or tag that is associated with the locations 116, 118, such as "Elm Street 1" or "Neighborhood 2" to differentiate between the pickup locations and, as will be described below, to simplify processing and verification of requests received from users. These tags could include metadata included in a map or location resource.

Figure 2A:
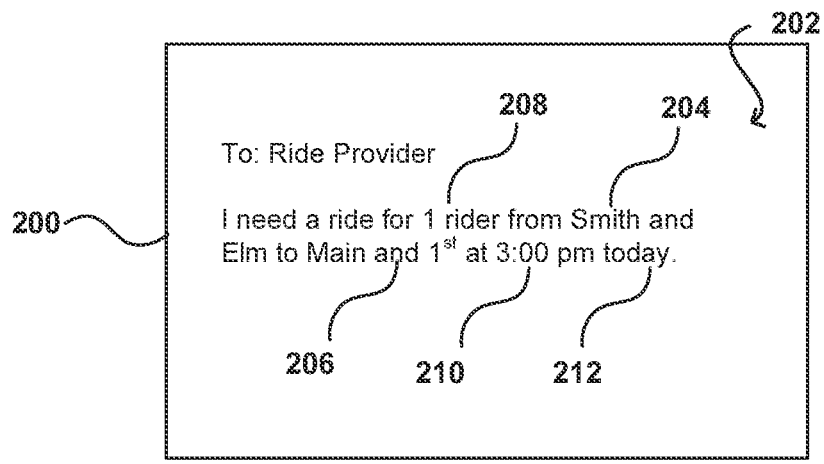
FIGS. 2A, 2B, and 2C illustrate notification flows indicating a ride request, a confirmation, and a request for additional information that can be generated which aspects of various embodiments can be implemented.
Figure 2B:
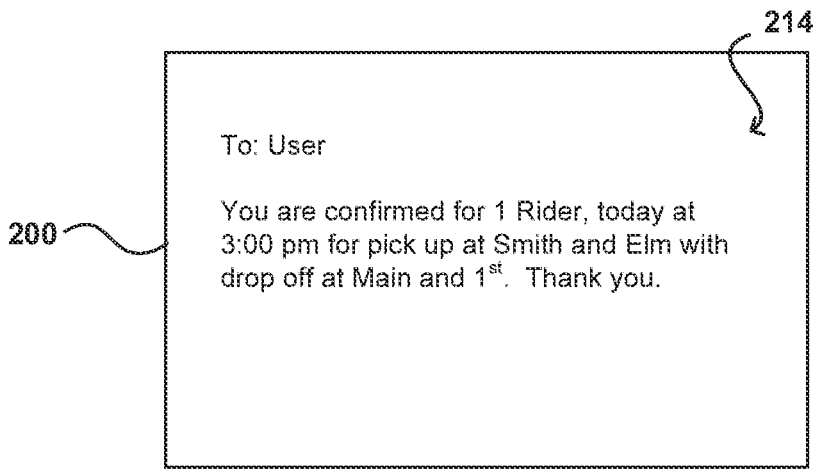
Figure 2C:
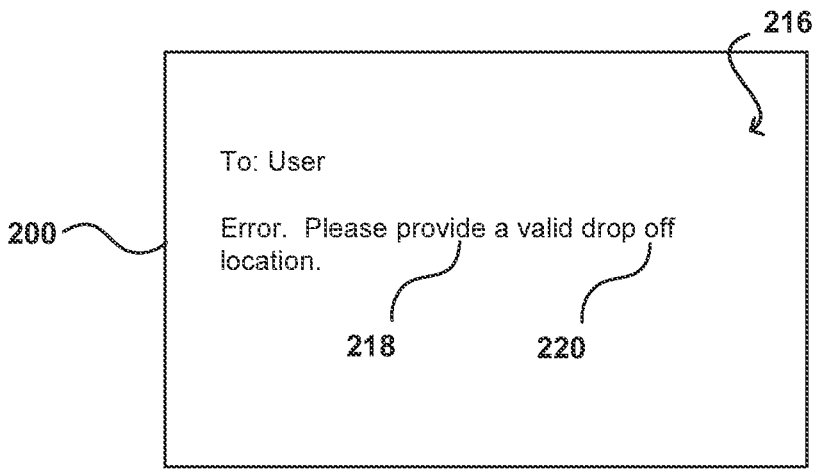

FIGS. 2A through 2C illustrate an example message flow that a user may provide to a provider to request a pick up and drop off. The user may submit the ride request via a text messaging service, such as SMS, for example if the user does not have access to a "smartphone" or if the Internet data service for the user's device is not working or the user elects not to use the data service, such as if the user were roaming or traveling in a foreign country. As will be described infra, enabling such a request/verification service may enable users without access to devices capable of Internet data service to utilize the service and may also be attractive for users that prefer not to use Internet data service.

A display 200 may include a request 202 submitted by the user. As described above, the request 202 is in the form of a text message communication, such as an SMS. The request 202 includes information that may be utilized by the provider to identify and/or coordinate with the request, which may be referred to herein as salient information. For example, in the illustrated request 202, salient information may correspond to a pick up location 204, a destination 206, a number of riders 208, a time 210 (e.g., time component), and a date 212. As will be described below, one or more text extraction services may be utilized to parse the information provided in the request 202 in order to verify the request and provide a confirmation to the user.

FIG. 2B illustrates the display 200 and a confirmation 214 provided back to the user from the provider. The confirmation 214 may be based on one or more factors, such as the user providing sufficient information and/or information corresponding to one or more requirements of the provider. For example, the provider may establish a set of rules that determine whether or not the confirmation is sent, such as not sending a confirmation if the request fails to identify a pick up location or time. FIG. 2C illustrates a return request 216 provided by the provider to the user to attempt to obtain additional information. The return request 216 can include a prompt 218 and an identifier 220 corresponding to information that the provider needs to fulfill the user's request. Because of the limited quantity of data that may be transmitted via SMS, and also the verification services, the return request 216 may include a simplified or short message that seeks to identify the salient information quickly and directly. That is, the return request 216 may be identified as a prompt to the user to provide one or more pieces of information. Different return requests 216 may be provided to the user for each piece of salient information. Additionally, as a single return request 216 may include prompts for multiple pieces of information. The provider may obtain information from the user to enable the provider to initiate the requested transportation service.

FIGS. 3A through 3H illustrate an example message flow that can be provided for display to a user, rider, or other such entity in accordance with various embodiments. The user may provide a request for a ride, receive a prompt from the provider indicating that the request was invalid, provide additional information to the provider, receive a confirmation from the provider, request a change from the provider, and receive a second confirmation indicative of the requested change.

Figure 3A:
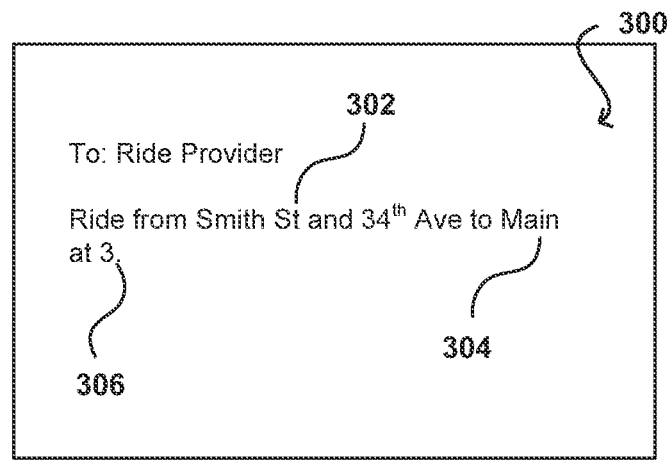
FIGS. 3A, 3B, 3C, 3D, 3E, 3F, 3G, and 3H illustrate example notification flows for requesting and modifying a ride that can be generated which aspects of various embodiments can be implemented.

FIG. 3A includes a request 300 submitted by a user. The request 300 may correspond to a request for a ride between two locations at a particular time on a particular date. The request is for "Ride from Smith St and 34th Ave to Main at 3." One or more of the pieces of information within the request 300 may be considered salient information by the provider, such as a pick up location 302, a destination 304, and a time 306. When compared to the request in FIG. 2A, several pieces of information may be considered missing or incomplete. For example, there is no indication as to the number of riders. Additionally, "at 3" is not indicative as to whether the ride will occur at 3 AM or 3 PM. Furthermore, the intersections for the pickup location 302 and/or the destination 304 may be incorrect and/or incomplete. For example, there is no cross street for "Main," which may be flagged as invalid by the provider. However, one or more features of the verification service described herein may be utilized to determine the location before providing a prompt back to the user. For example, if only one pre-determined drop off location exists on "Main" then the provider may accept such a destination 304. As such, the request 300 submitted by the user may be considered incomplete by the provider, and as a result, the provider may not provide a confirmation.

Figure 3B:
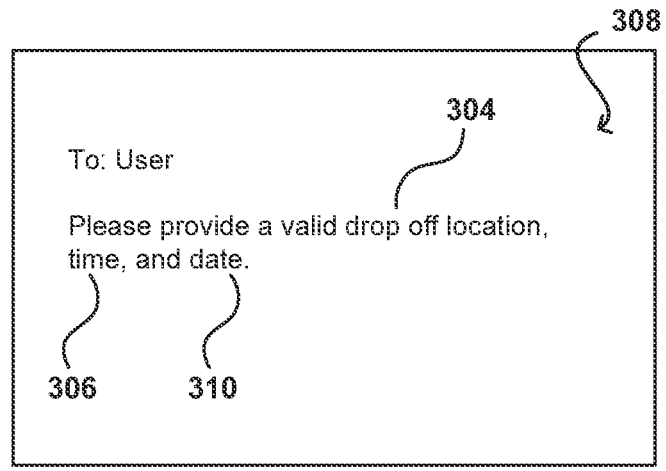

FIG. 3B illustrates a return request 308 prompting the user to provide additional information in order to complete the request 300. It should be appreciated that the return request 308 is by way of example only and more or fewer pieces of additional information may be requested by the provider based on one or more rules established by the provider for determining whether a valid request is received. The return request 308 includes "Please provide a valid drop off location, time, and date." However, it should be appreciated that individual return requests 308 may be provided by the user to receive the destination location 304, the time 306, and a date 310. That is, the provider may transmit a first return request 308, wait for a response, verify that response, and then transmit subsequent return requests 308 until sufficient salient information is obtained to validate the request from the user.

Figure 3C:
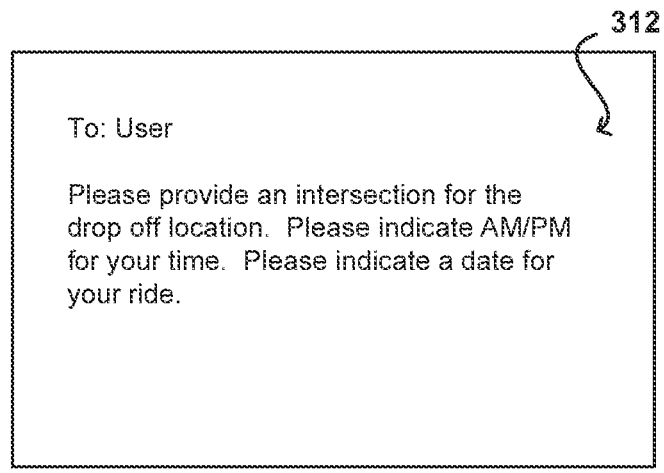
Figure 3D:
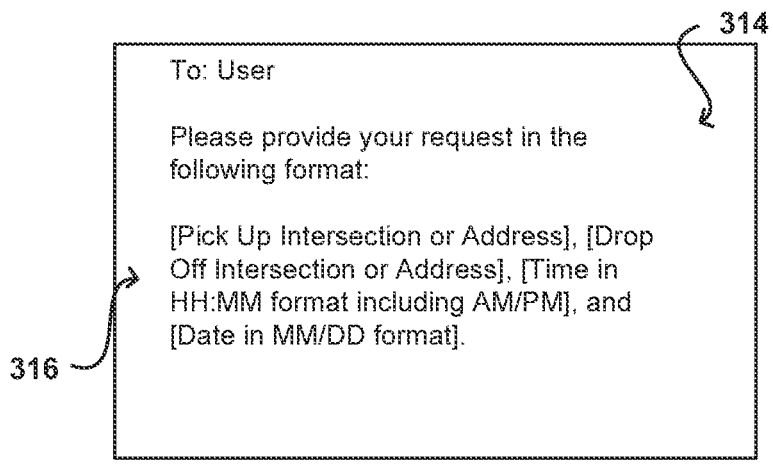

As described above, the request 300 and the return request 308 are transmitted via SMS, and as a result the information provided and/or the simplicity of the requests may be important to provide an improved user experience. For example, the user may receive the return request 308 and not know why the additional information is necessary. Accordingly, the return request 312 in FIG. 3C provides additional guidance to the user to streamline the process of obtaining sufficient information to verify the request 300. The return request 312 includes guidance for the destination location 304 by indicating that an intersection is necessary. Additionally, the guidance for the time 306 indicates that AM or PM should be specified. Finally, the guidance for the date 310 requests the date for the ride. It should be appreciated that other types of guidance or requests may be provided and the return request 312 is by way of example only. For example, as illustrated in FIG. 3D, the provider may transmit a return request 314 to the user including a template 316 indicative of how information should be arranged/organized to the provider. The template 316 can include a requested order of components, a time format, a date format, and the like. Accordingly, responses from the user that correspond to this format may be quickly checked and verified. As will be described below, utilizing a template for requests may be beneficial for extracting information. However, in various embodiments, templates may be difficult for users to remember, and as a result, different text evaluation and extraction methods may be utilized.

Figure 3E:
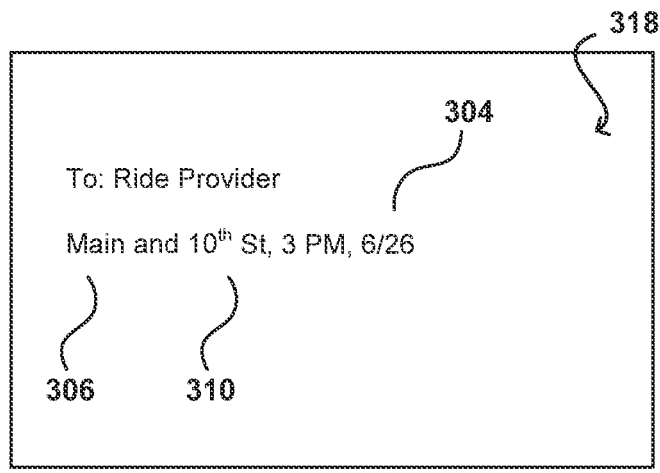

FIG. 3E illustrates a prompt response 318 from the user back to the provider. The user has corrected the identified errors and has returned a response in the requested format.

However, it should be appreciated that in other embodiments the user may provide the prompt response 318 as a repeat of the initial request 300 with some additional information, as a direct response to the return request 308, or in any other format that enables verification of the request 300. Upon receipt of the prompt response 318, the provider may analyze the new information, correlate the new information with information obtained from the original request 300, and verify whether a valid request is made.

Figure 3F:
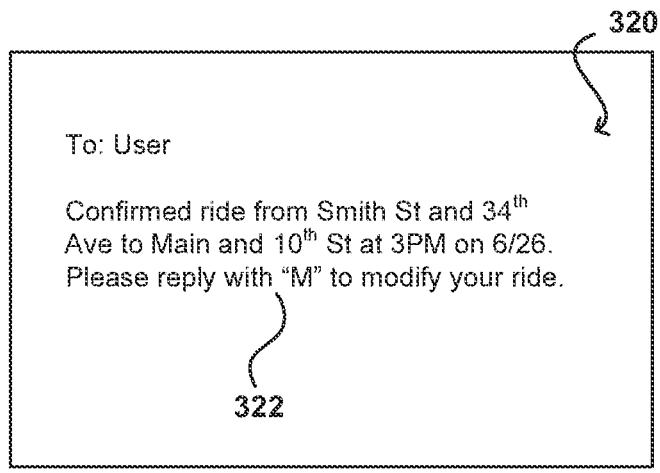

FIG. 3F illustrates a confirmation 320 to the user from the provider upon determination that the user's request is valid. The confirmation 320 repeats the salient information to the user to enable the user to further verify that the request was understood and processed by the provider. However, it should be appreciated that the confirmation 320 may not relay all of the information back to the user. The confirmation 320 may further include modification instructions 322 to enable the user to change or update their request. The modification instructions 322 can comprise a key or code to respond to the provider in order to begin with a process to update the request 300. It should be appreciated that additional information may be provided with the modification instructions 322, such as a numerical code to enable the provider to identify the reservation and/or a different number to send the message to. The user is still provided with the functionality of modifying or canceling their request, even after the confirmation is received.

Figure 3G:
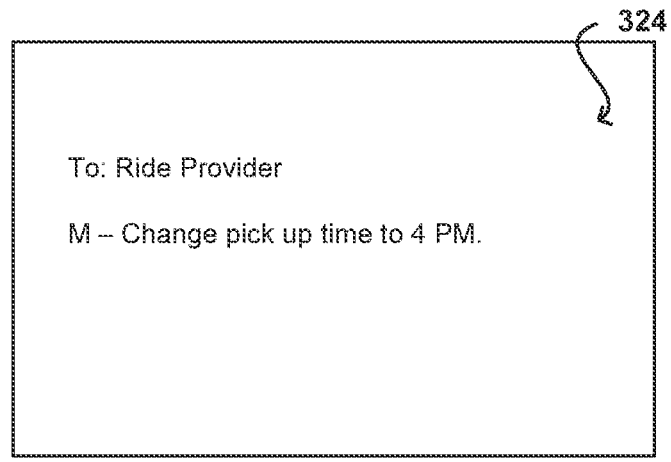
Figure 3H:
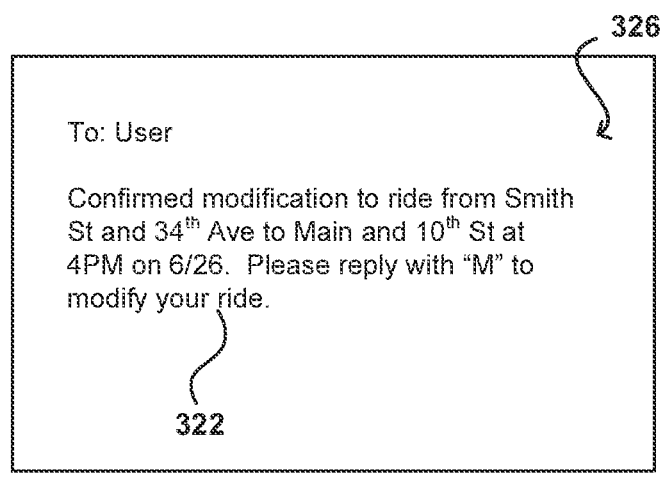

FIG. 3G illustrates an example of a modification request 324 transmitted from the user to the provider. The user may have followed the modification instructions 322 by including the code ("M" in this embodiment) and subsequently providing information regarding the desired modification. For example, the user has requested a change in the pickup time. FIG. 3H illustrates an example of a modification confirmation 326 transmitted from the provider to the user. As illustrated, the provider confirms the new time with the user and further provides modification instructions 322 to enable further modifications from the user so as to tune or adjust their request.

The provider may also provide other communications to the user and also request additional information. For example, upon providing a confirmation to the user the provider may request a photograph of the user to help a driver identify the user. Additionally, the provider may provide updates to the user, such as indicating a driver may be late or specifying a make or model of a vehicle. As such, while communications regarding updating information and confirmations can be used, different communication exchanges between the user and provider may be practiced to improve the user experience.

Figure 4:
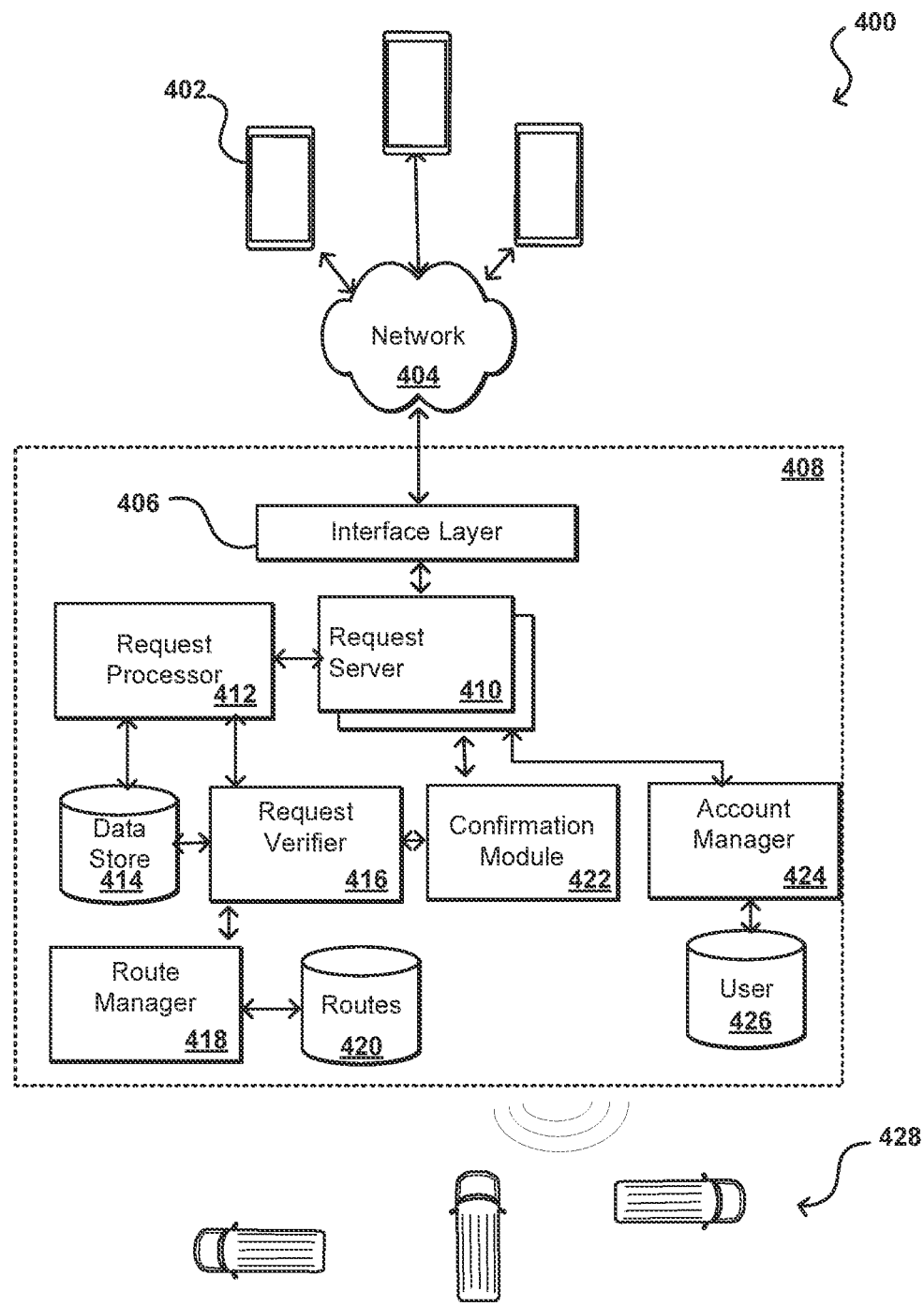
FIG. 4 illustrates an example system that can be utilized to implement aspect of the various embodiments.

FIG. 4 illustrates an example system 400 that can be utilized to manage ride requests received from one or more users on various types of computing devices 402. As described above, the ride requests may be transmitted via low or no-data communication protocols, such as cellular voice networks and SMS. The requests may be submitted over at least one network 404 to be received by an interface layer 406 of a service provider environment 408. The computing devices can be any appropriate devices known or used for submitting electronic requests, as may include desktop computers, notebook computers, smartphones, tablet computers, and wearable computers, among other such options. Furthermore, the computing devices may be non-smartphones or legacy phones without Internet data capabilities. The network(s) can include any appropriate network for transmitting the request, as may include any selection or combination of public and private networks using wired or wireless connections, such as the Internet, a cellular data connection, a Wi-Fi connection, a local area network connection (LAN), and the like. The service provider environment can include any resources known or used for receiving and processing electronic requests, as may include various computer servers, data servers, and network infrastructure as discussed elsewhere herein. The interface layer can include interfaces (such as application programming interfaces), routers, load balancers, and other components useful for receiving and routing requests or other communications received to the service provider environment.

The request transmitted from the user devices 402 to the service provider environment 408 may be routed to a request sever 410. The request server 410 may convert the request into an appropriate format, such as transcribing a vocal request into a written request or converting an SMS message into a text string for later processing. The request server 410 may utilize automatic speech recognition (ASR), natural language understanding (NLU), a context interpreter, a natural language generator, or the like, to convert auditory requests into textual requests that may be processed within the service provider environment. Furthermore, in various embodiments, the request server 410 may be in communication with a request processor 412. The request processor 412 receives the request, which as described above may have been converted or transformed into a different format via the request server 410, and extracts salient information from the request. For example, the request processor 412 may use optical character recognition (OCR) to extract certain words or numbers from the request. That is, in various embodiments the request processor 412 includes a text identification and recognition process to identify salient information within the text string for extraction and use. The identification and recognition process may utilize multiple techniques, such as parsing words or phrases, truncating words, and identifying relevant portions of the message for later analysis and verification.

A data store 414 may be accessible by the request processor 412. The data store 414 may include templates, as described above, to facilitate extraction and identification of salient information from the request. For example, the request may be processed by the request processor 412 by evaluating words in relation to their position relative to a template from the data store 414, as a result, as words or numbers are identified in the positions on the template they may be extracted and identified as one or more salient pieces of information, such as pick up location or time. Furthermore, in various embodiments, the data store 414 may include a list of locations identified by one or more codes or tags. For example, the data store 414 may include a tag for "Neighborhood 2" which corresponds to an address. Accordingly, if the request includes the tag "Neighborhood 2" the request processor 412 will associate the tag with a corresponding address to identify a pick up or drop off location. It should be appreciated that various other pieces of information for facilitating the processing and verification of the data may be included within the data store 414, as will be described in further detail below.

The request processor 412, upon extracting the salient information, may communicate with the illustrated request verifier 416 to evaluate the salient information to determine whether a valid request has been supplied to the provider. The request verifier 416 may access the data store 414 to obtain one or more pieces of information, such as the above-described templates, a set of rules, or the like, to determine whether a request in valid. For example, in various embodiments, the request verifier 416 may determine whether locations include an address, a valid intersection, or a predetermined code. Furthermore, the request verifier 416 may determine whether the time includes an AM or PM indicator and whether a valid date has been entered.

The request verifier 416 communicates with a route manager 418 communicatively coupled to a route database 420. The route manager 418 may evaluate various locations within a city center or location of the user to determine whether an acceptable route is available given one or more preferences from the user. For example, the request may indicate the user desires a ride to a park and ride location for subsequent drop off at a downtown office location. The route manager 418 may access the route database 420 to determine whether the park and ride offers a bus to take the user to the downtown office location. If not, the route manager 418 may communicate the information to the request verifier 416, which may then return a response to the user via a confirmation module 422. The confirmation module 422 may relay information back to the user, for example via the interface layer 406. As described above, the confirmation module 422 may provide a message to the user indicating that the request was successfully received and is valid, or the confirmation module 422 may request additional information from the user when the request is indicated as being invalid.

The request server 410 may further be in communication with an account manager 424 having access to a user database 426. The user database 426 may store information about the users, such as payment information, demographic information, favorite locations, and the like. The account manager 424 may evaluate whether the user's account is active or in good standing upon receipt of the request and further track the request along different locations, for example upon pick up and drop off to thereafter charge the user for use of the service. Accordingly, the service provider environment 408 may provide the information related to the user request to a fleet 428, which may then pick up and/or drop off the user in accordance with the instructions received from the request.

The service provider environment 408 can be configured or adapted to determine a transportation request for a user. The transportation request specifies salient information selected from an origin, a destination, or a time component. Any of these individual elements or combinations thereof can be analyzed for errors. The service provider environment 408 can parse the transportation request and determine if the transportation request includes an error. In general, the error would include any discrepancy or lack of salient information that would prevent completion of the transportation request. As noted above, the comparative and verification functionality can exist within the request verifier 416.

The service provider environment 408 can further be configured to transmitting a request to the user to correct the transportation request. The request can identify a portion of the salient information that produced the error. If corrected information is received, the request verifier 416 of the service provider environment 408 can determine if the error is corrected based on the corrected salient information received from the user. In one example, the user can be requested to correct an address that produced an error. The information provided to the user can identify the specific portion of the salient information that caused the error. If the corrected salient information resolves the error, the service provider environment 408 can transmit a confirmation to the user.

Figure 5:
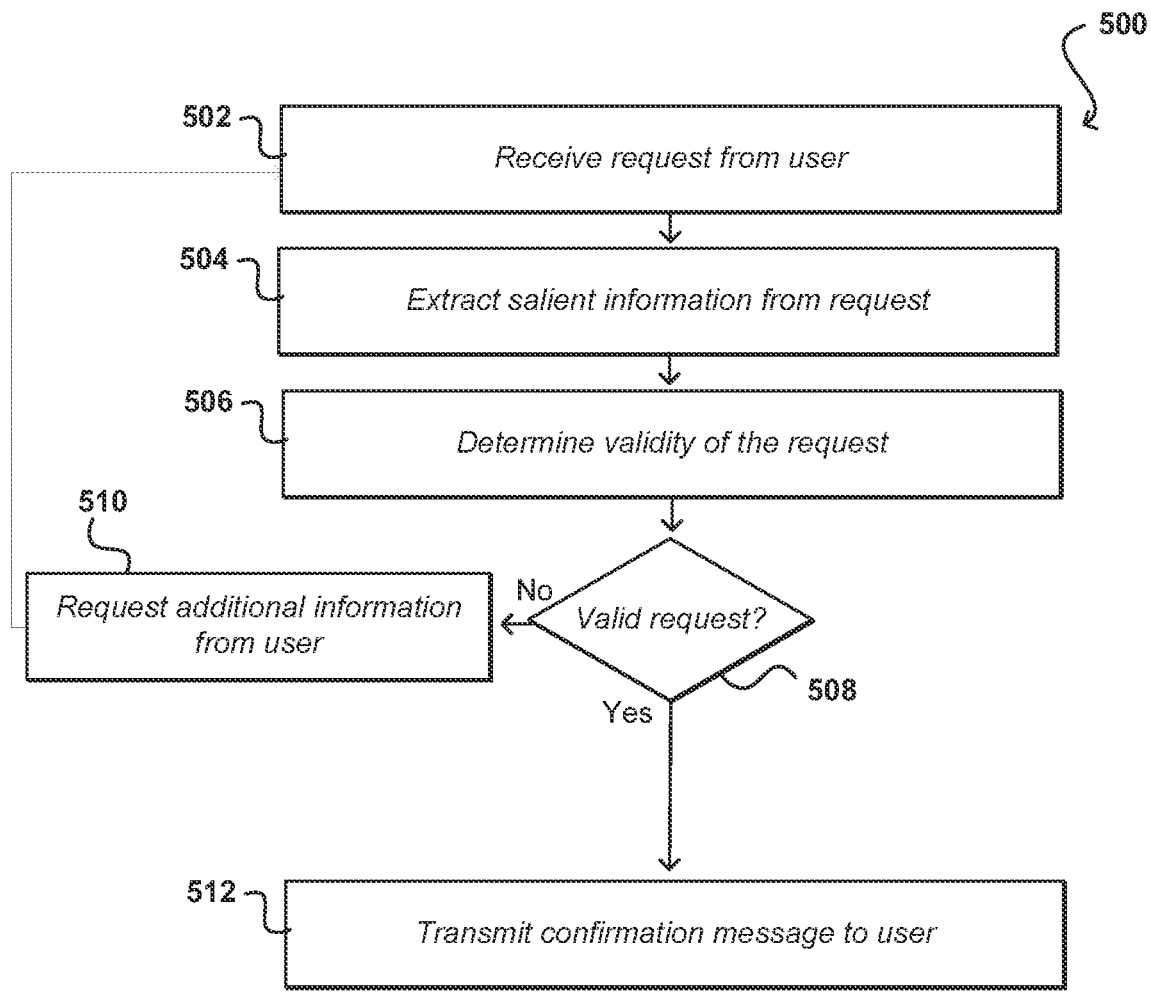
FIG. 5 illustrates an example process for receiving and verifying a ride request that can be utilized in accordance with various embodiments.

FIG. 5 illustrates an example process 500 for receiving and confirming a ride request. It should be understood that, for this and other processes discussed herein, there can be additional, fewer, or alternative steps, performed in similar or alternative steps, or in parallel, within the scope of the various embodiments unless otherwise stated. A request is received 502 for a journey. The journey may be from a user's home to a final destination. However, in other embodiments, the journey may represent a portion of a total journey, for example, to an intermediate location where a different transportation modality may be utilized to reach the user's final destination. The process may also include extracting salient information from the request 504. For example, the ride provider may utilize the service provider environment 408 to extract information from the request utilizing one or more auditory or textual processing techniques in order to extract salient information, which may correspond to pick up location, drop off location, time, date, number of riders, and the like. Next, the extract information may be analyzed to determine whether it is a valid request 506. For example, a valid request may correspond to providing sufficient information to enable the journey. As used herein, sufficient may refer to a threshold level of information to enable the service provider to provide a requested journey to the user. For example, sufficiency may correspond to providing a pick up location and drop off location, for example, when times are on a fixed schedule. Additionally, sufficiency may correspond to providing a pick up location, a drop off location, a time, and a date. Furthermore, a component of a sufficient request may be related to providing a valid street address or intersection for the pickup and drop off locations. It should be appreciated that the provider may particularly determine what constitutes sufficient and may utilize one or more other techniques, such as machine learning or data storage applications, in order to correlate or otherwise associate information provided by users to the provider.

The provider may analyze whether or not the request is valid 508. For example, a request that did not provide enough salient information, or incorrect salient information, may be deemed invalid and the provider may transmit a message to the user requesting additional information 510. The incorrect or erroneous information can relate to any portion of the transportation request that is determined to be necessary for completing the transportation request. For example, an errant number in a destination location may result in the identification of an erroneous destination due the service provider determining that the specified destination location is unresolvable (e.g., cannot be determined from mapping information).

However, if the request is determined to be valid than the provider may transmit a confirmation message to the user 512. In this manner, simplified ride requests, for example using SMS or voice services, may be analyzed and fulfilled by ride providers where users are not utilizing Internet data services on their user devices.

Figure 6:
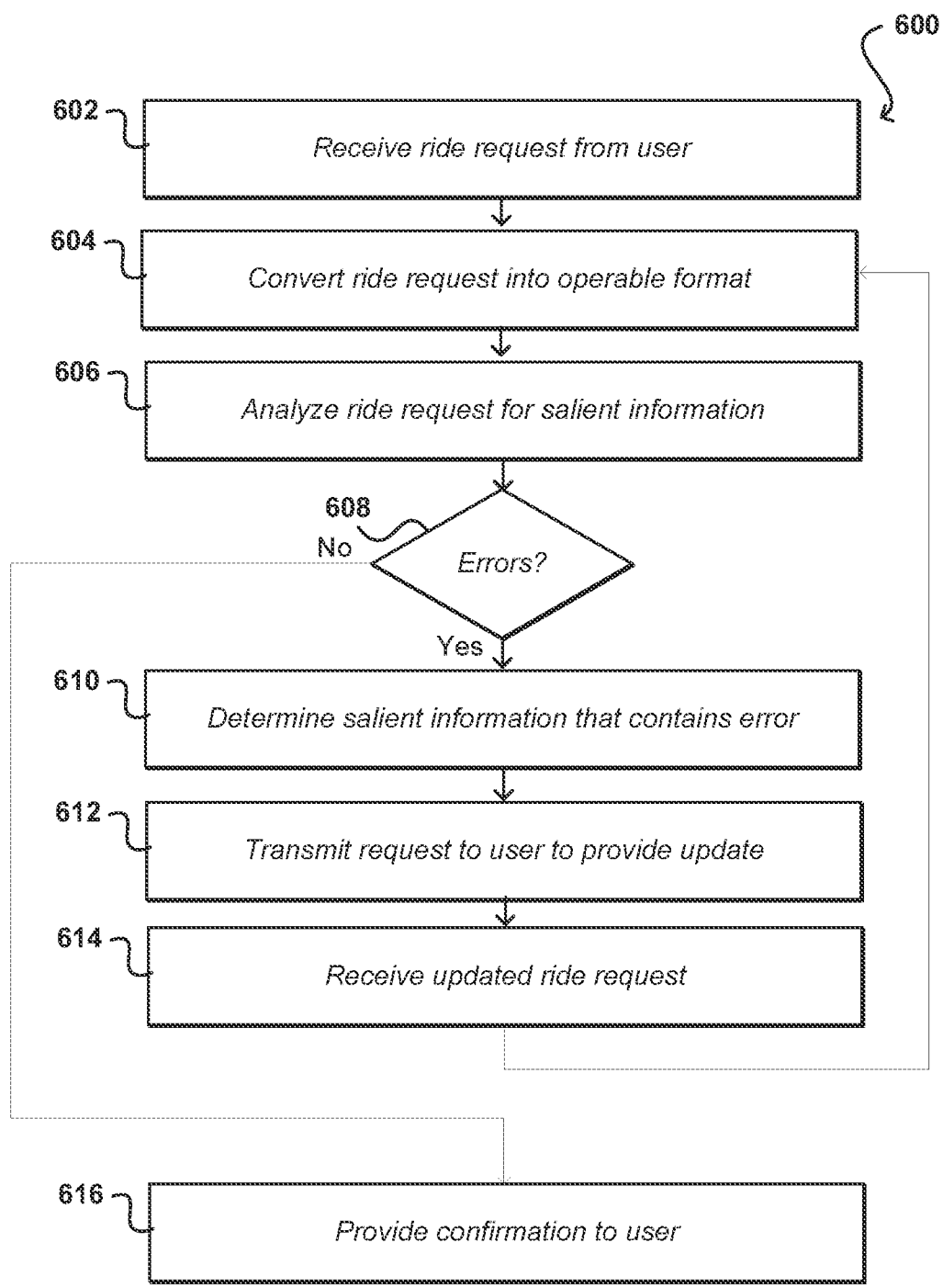
FIG. 6 illustrates an example process for receiving and verifying a ride request that can be utilized in accordance with various embodiments.

FIG. 6 illustrates an example process 600 for analyzing a ride request from a user. A request is received 602 from a user, for example for a ride from a first location to a second location. In various embodiments, the request may be transmitted via SMS or voice communication that use limited or no Internet data service. Because the request may be transmitted in a variety of low or no-data formats, the process may further include converting the request into an operable format 604, for example into a text string. As described above, in various embodiments the request may be transmitted over voice communication and speech recognition services may be utilized to convert the voice request into a textual format that may be further analyzed by a ride provider.

The request may be analyzed for salient information 606. For example, the converted request may be processed utilizing one or more information analysis and extraction techniques in order to identify salient information, which may be predetermined by the provider. The salient information may be identified by its location within the request, for example, corresponding to a template. One or more rules may be established when analyzing the information to develop a confidence that certain information corresponds to salient information. For example, a phrase like "Ride to Point A from Point B" may be analyzed such that a location following "to" is likely the destination and a location following "from" is likely a starting point. Furthermore, in various embodiments, other information indicative of certain salient information may be utilized, such as numbers associated with "AM" or "PM" to indicate times. This analysis may enable the provider to extract the salient information to prepare the requested ride.

Upon obtaining the salient information, the process can determine whether or not there is an error 608 associated with the salient information. For example, the error may correspond to an address that is not recognized by the provider. Additionally, the error may correspond to an unspecified time, an unspecified date, an unintelligible request, an unspecified pick up or drop off location, or any other error that would make it difficult or unlikely for the ride to be completed as requested. If there is no error, the provider may transmit a confirmation to the user 616, which may include information regarding the scheduled ride.

Errors may be detected and the process may determine which piece of salient information that error corresponds to 610. For example, an error may be associated with a pick up location that does not provide an address or an associated cross street when an intersection is specified. By determining the specific error, future corrective action may be transmitted to the user utilizing the low or no-data transmission service that the user initially utilized to transmit the request. For example, the process may include transmitting a request to the user to provide an update 612. The request may be instructive regarding the specific piece of salient information to be updated or corrected. Furthermore, the request may include a template to illustrate to the user how to format their response. Next, an updated or corrected ride request is received 614. The updated or corrected ride request may include a full ride request, a portion of a ride request, or an update to the requested salient information. The updated or corrected ride request may then be processed to evaluate for further errors until the confirmation may be transmitted.

Figure 7:
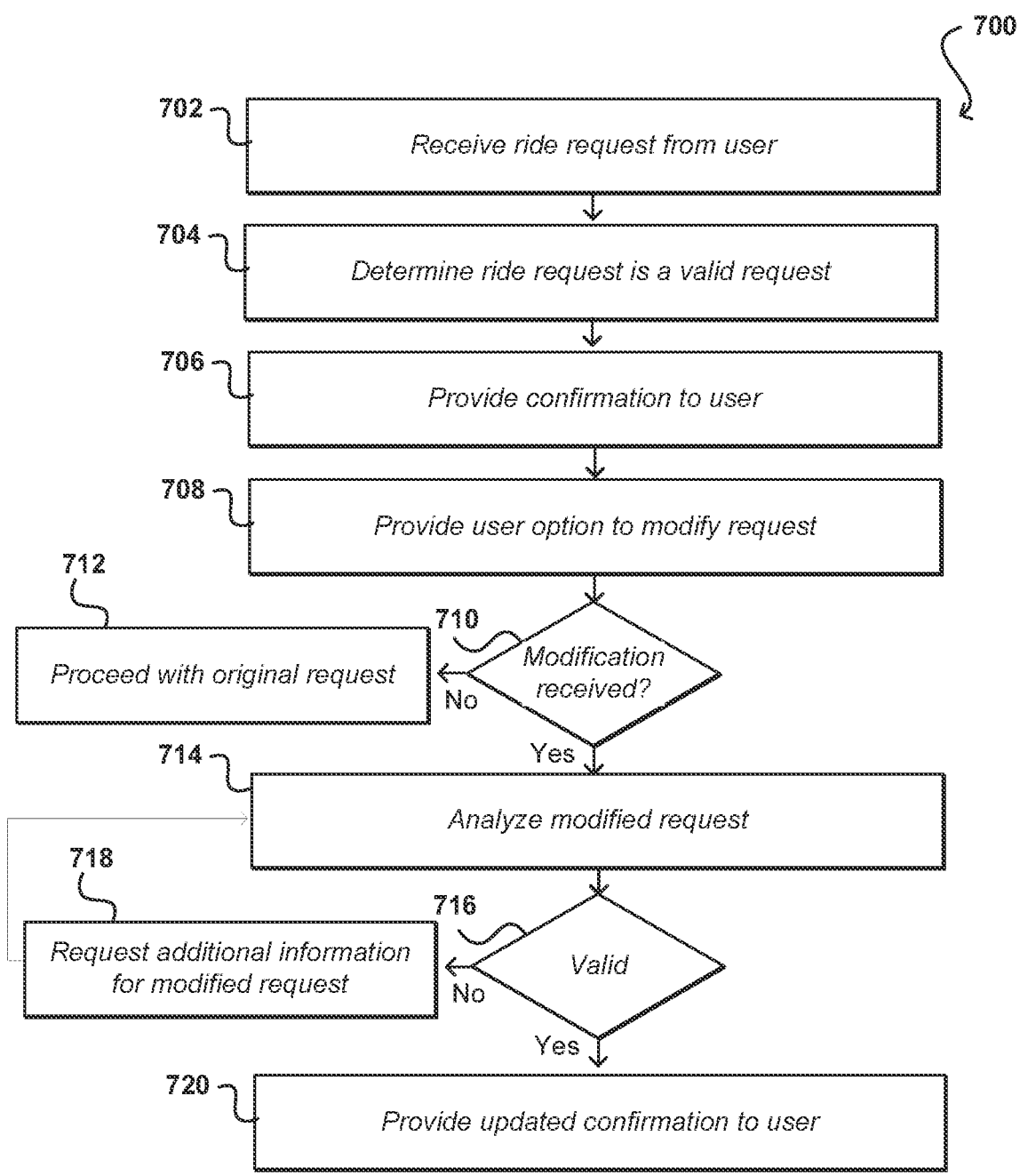
FIG. 7 illustrates an example process for receiving and verifying a ride request that can be utilized in accordance with various embodiments.

FIG. 7 illustrates an example process 700 for receiving a modification to a confirmed ride request. In this example, a ride request from a user is received 702. As described above, in various embodiments the ride request may be transmitted from a user device that uses little to no Internet data service. Upon receipt of the request, the request is analyzed for validity and determined to be valid 704. For example, different pieces of salient information may be extracted from the request and correlated with known information, such as information in a database. The salient information may include a pick up location, drop off location, time, date, number of riders, and the like. When the request is valid, a confirmation is provided to the user 706. The confirmation may be accompanied by an option to modify the request 708. For example, the confirmation may include instructions that provide a code or the like to the user to modify the previous request. Such modifications may relate to any of the salient information previously provided by the user.

The process determines whether a modification request is received 710. If not, the original request is maintained and acted on 712. However, if a modification request is received, for example via receipt of the code or other instructions provided by the ride provider, the modified request may be analyzed 714. For example, as described above, the modified request may be compared to the original request to identify one or more pieces of salient information that are being changed. The modified request may be evaluated for validity 716, as described above, to determine whether the change enables the ride to continue. For example, an invalid change could be specifying a time in the past. If the request is invalid, additional information may be requested 718. If the request is valid, an updated confirmation may be provided 720. In this manner, the user has the option of updating and changing their requests.

Figure 8:
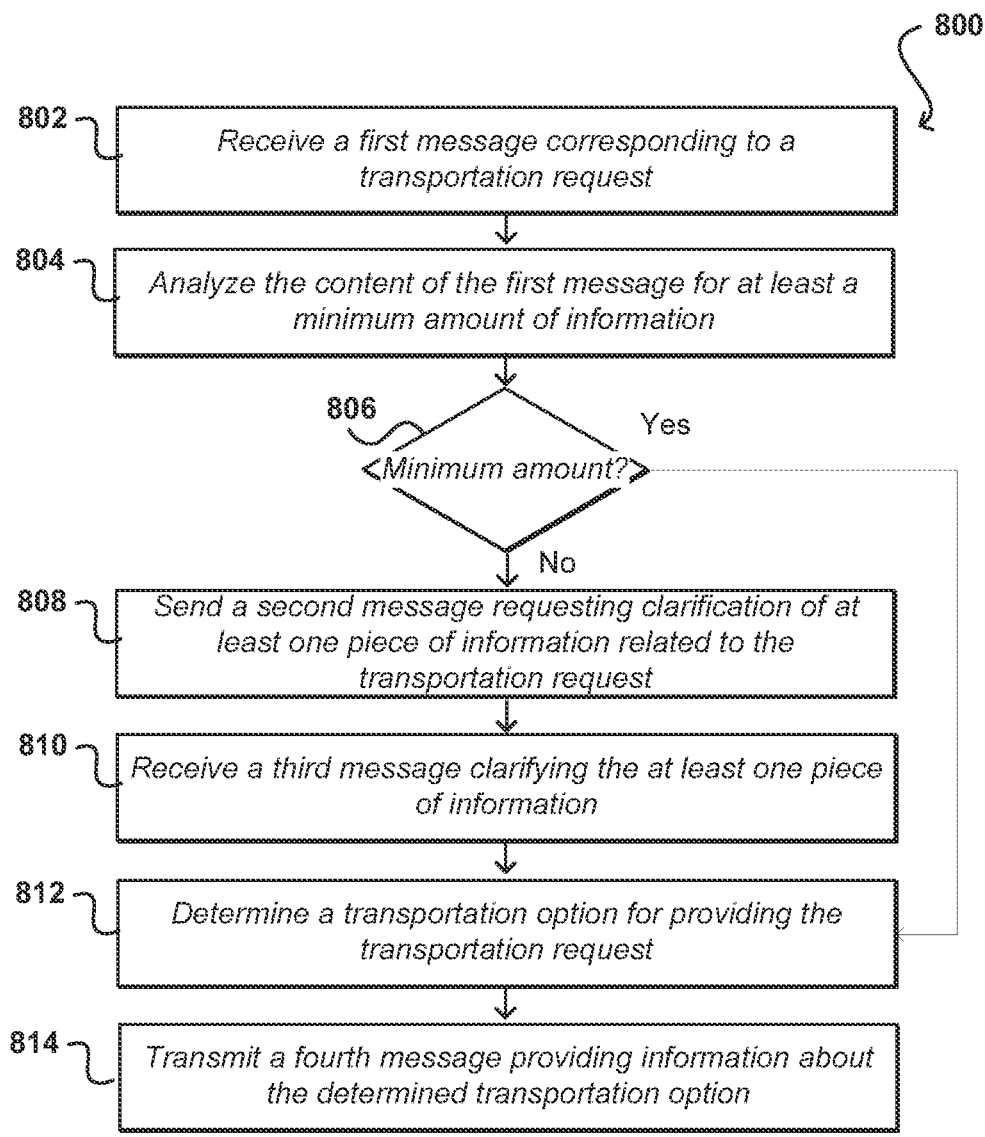
FIG. 8 illustrates an example process for determining a transportation option that can be utilized in accordance with various embodiments.

FIG. 8 illustrates a process 800 for determining a transportation option. In this example, a first message corresponding to a transportation request is received 802. For example, the first message may be an SMS communication that includes textual information indicative of a request for a journey between a first location and a second location. The transportation request may include one or more pieces of information, such as a pick up location, drop off location, number of riders, time of day, date, and the like, as described above. The first message may be analyzed for at least a minimum amount of information 804. For example, the minimum amount of information could correspond to one or more pieces of information that enable the transportation request to selected and completed. The minimum amount of information may correspond to a pick up location, a drop off location, and a time. However, in other embodiments, more or fewer pieces of information may be sufficient to provide the minimum amount of information. For example, the pickup location may be an intermediate location where a continuously rotating fleet of vehicles is available to accept riders on demand. As a result, the time may not be necessary to provide sufficient information to fulfill the transportation request. It should be appreciated that various voice or textual processing systems may be utilized to analyze the first message. For example, text recognition and extraction may be utilized to compare various portions of the first message to determine whether the minimum amount of information is present 806.

If the minimum amount of information is present, a transportation option is determined 812. However, if the minimum amount of information is not present, a second message may be transmitted requesting clarification of at least one piece of information to satisfy the minimum amount. As described above, the at least one piece of information may correspond to a pick up location, a drop off location, a time, and the like. A third message is received that clarifies the at least one piece of information 810. For example, if the second message were to indicate that a drop off location were required, the third message may provide the drop off location to clarify the at least one piece of information. Upon receipt clarifying information, the transportation option may be determined 812. A fourth message is transmitted providing information about the determined transportation option 814. As described above, the fourth message may be a confirmation message. In this manner, messaging services may be used to submit transportation requests.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, any component disclosed in the Figures may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A computer-implemented method, the method comprising:
   receiving, by a server and from a first telecommunications device, a first message, wherein the first message is a first short messaging service (SMS) message, the first message including a transportation request corresponding to a journey between a first location and a second location at a specified time;
   converting, by the server, the first message into a different format using at least one of: automatic speech recognition (ASR), natural language understanding (NLU), a context interpreter, and a natural language generator;
   comparing the first message to a template stored in memory;
   determining, based on the comparison between the first message and the template, information associated with the transportation request including at least the first location and second location;
   determining, through an identification process, whether a minimum amount of information for the journey is determinable from the transportation request, wherein the identification process comprises parsing words or phrases, truncating words, or identifying relevant portions of the first message;
   sending a second message to the first telecommunications device requesting clarification of a portion of the information for the journey when the minimum amount of information is not determinable from the request;
   receiving, from the first telecommunications device, a third message clarifying the portion of the information;
   determining the second location from the first message based on a pre-determined code or tag included within the first message;
   determining a transportation option for providing the transportation request; and
   transmitting a fourth message to the first telecommunications device including information for the determined transportation option.

2. The computer-implemented method of claim 1, further comprising providing a template with the second message to the first telecommunications device, the template specifying a format in which to present the portion of the information.

3. The computer-implemented method of claim 1, further comprising:
   receiving a fifth message from the first telecommunications device, the fifth message including an update request corresponding to a change in the journey from the first location to the second location;
   analyzing a content of the fifth message to determine whether a minimum amount of information for the journey is determinable from the updated request; and
   determining an updated transportation option for providing the update request.

4. The computer-implemented method of claim 1, wherein the minimum amount of information corresponds to a pick up location, a drop off location, a time, or a date.

5. The computer-implemented method of claim 1, further comprising providing a code with the fourth message, to the first telecommunications device, the code corresponding to a request to change the transportation option.

6. The computer-implemented method of claim 1, further comprising providing a fifth message to the first telecommunications device, the fifth message including at least one of an estimated time of arrival or identifying characteristics of the transportation option.

7. The computer-implemented method of claim 1, further comprising transmitting a fifth message to the first telecommunications device, the fifth message including a third location within a predetermined distance of the first location or the second location, the third location corresponding to one of a starting location or an ending location for the journey.

8. The computer-implemented method of claim 1, further comprising:
   transmitting a fifth message to the first telecommunications device, the fifth message including a second transportation option; and
   receiving, from the first telecommunications device, a sixth message including a decision selecting one of the transportation option or the second transportation option.

* * * * *